(12) United States Patent
Shimatani et al.

(10) Patent No.: US 6,472,338 B1
(45) Date of Patent: Oct. 29, 2002

(54) $Li_2O$-$Al_2O_3$-$SiO_2$ CRYSTALLIZED GLASS AND CRYSTALLIZABLE GLASS THEREFOR

(75) Inventors: Narutoshi Shimatani, Uji (JP); Hiroyuki Yamada, Kusatsu (JP); Akihiko Sakamoto, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 196 days.

(21) Appl. No.: 09/626,750

(22) Filed: Jul. 27, 2000

(30) Foreign Application Priority Data

Aug. 2, 1999 (JP) .......................................... 11-219060

(51) Int. Cl.[7] ...................... C03C 10/12; C03C 10/14
(52) U.S. Cl. ........................................... 501/7; 501/4
(58) Field of Search .......................................... 501/4, 7

(56) References Cited

U.S. PATENT DOCUMENTS

| | | | | |
|---|---|---|---|---|
| 5,212,122 A | * | 5/1993 | Pannhorst et al. | 501/69 |
| 5,446,008 A | * | 8/1995 | Krolla et al. | 501/68 |

FOREIGN PATENT DOCUMENTS

| | | |
|---|---|---|
| DE | 43 21 373 | 1/1995 |
| JP | 39-21049 | 9/1939 |
| JP | 40-20182 | 9/1940 |
| JP | 1-308845 | 12/1989 |
| JP | 3120422 | * 12/2000 |

* cited by examiner

*Primary Examiner*—Karl Group
(74) *Attorney, Agent, or Firm*—Collard & Roe, P.C.

(57) ABSTRACT

$Li_2O$—$Al_2O_3$—$SiO_2$ crystallized glass is provided which has clarity and glass characteristics equivalent to or superior to a conventional crystallized glass, even when the content of $As_2O_3$ is decreased. The $Li_2O$—$Al_2O_3$—$SiO^2$ crystallized glass consists essentially of, by weight, 60 to 75% $SiO_2$, 17 to 27% $Al_2O_3$, 3 to 5% $Li_2O$, 0 to 0.9% MgO, 0 to 0.9% ZnO, 0.3 to 5% BaO, 0 to 3% $Na_2O$, 0 to 3% $K_2O$, 0 to 4% $TiO_2$, 1 to 4% $ZrO_2$, 0 to 4% $P_2O_5$, 0.05 to 2% $Sb_2O_3$, 0 to 0.9% MgO+ZnO, and 0 to 4% $Na_2O$+$K_2O$.

2 Claims, No Drawings

LI$_2$O-AL$_2$O$_3$-SIO$_2$ CRYSTALLIZED GLASS AND CRYSTALLIZABLE GLASS THEREFOR

BACKGROUND OF THE INVENTION

1. Field of the Invention

The present invention relates to Li$_2$O—Al$_2$O$_3$—SiO$_2$ crystallized glass and Li$_2$O—Al$_2$O$_3$—SiO$_2$ crystallizable glass therefor.

2. Description of the Related Art

Conventionally, Li$_2$O—Al$_2$O$_3$—SiO$_2$ crystallized glass has been used for front glass panels in kerosene heaters, wood stoves, and the like, substrates for high-technology products such as color filters and image sensors, setters for baking electronic devices, shelf boards for microwave ovens, top plates for electromagnetic cooking devices, window glass for fire doors, and the like.

For example, Japanese Examined Patent Publication (JP-B) No. S39-21,049, Japanese Examined Patent Publication (JP-B) No. S40-20,182, and Japanese Unexamined Patent Publication (JP-A) No. H01-308,845 disclose Li$_2$O—Al$_2$O$_3$—SiO$_2$ crystallized glass having a β-quartz solid solution represented by the formula Li$_2$O—Al$_2$O$_3$.nSiO$_2$, in which n≧2, or a β-spodumene solid solution represented by the formula Li$_2$O—Al$_2$O$_3$.nSiO$_2$, in which n≧4, both of which are produced in the crystallized glass as a main crystal.

The Li$_2$O—Al$_2$O$_3$—SiO$_2$ crystallized glass mentioned above has high mechanical strength and superior thermal characteristics, such as a low coefficient of thermal expansion. In addition, since the crystal produced in the Li$_2$O—Al$_2$O$_3$—SiO$_2$ crystallized glass is alterable by changing heating conditions in a crystallization process, transparent crystallized glass (a β-quartz solid solution (produced) and white and opaque crystallized glass (a β-spodumene solid solution is produced) can be produced from the same composition of raw glass materials. Consequently, in accordance with the application, Li$_2$O—Al$_2$O$_3$—SiO$_2$ crystallized glass suitable for the application can be selectively produced.

When this kind of crystallized glass is produced, it is required to heat up to a high temperature above 1,400° C. for melting raw glass materials. Accordingly, as a fining agent added to one batch for glass production, arsenic oxide (As$_2$O$_3$) is used which is capable of evolving a great deal of gas for fining during melting at a high temperature. In melting in a batch production system, As$_2$O$_3$ contained in raw glass materials is oxidized at 400 to 500° C. so as to form As$_2$O$_5$, and the As$_2$O$_5$ is again reduced at 1,200 to 1,800° C. to form As$_2$O$_3$, whereby oxygen gas is evolved. The oxygen gas thus evolved diffuses into bubbles in the glass, and the bubbles enlarge, facilitating rising thereof, whereby the bubbles are removed. Since As$_2$O$_3$ has the fining effect described above, As$_2$O$_3$ has been widely used as a fining agent for glass. In particular, As$_2$O$_3$ is a very effective fining agent for Li$_2$O—Al$_2$O$_3$—SiO$_2$ crystallized glass that must be subjected to melting at a high temperature.

In addition to the fining effect, As$_2$O$_3$ has an effect of promoting crystallization. Accordingly, it is understood that As$_2$O$_3$ is an essential component in order to obtain desired characteristics of the crystallized glass described above.

However, As$_2$O$_3$ is highly toxic, and hence, environmental pollution may occur during a manufacturing process for glass, disposal of waste glass, and the like. Accordingly, it is desirable to reduce the amount of As$_2$O$_3$ used. However, when the amount of As$_2$O$_3$ is simply decreased, the effects on fining and crystallization are degraded, and as a result, clarity and glass characteristics, which are equivalent to those obtained if the amount of As$_2$O$_3$ were not decreased, cannot be obtained.

SUMMARY OF THE INVENTION

Accordingly, it is an object of the present invention to provide Li$_2$O—Al$_2$O$_3$—SiO$_2$ crystallized glass having clarity and glass characteristics equivalent to or superior to those of conventional crystallized glass, even when the amount of As$_2$O$_3$ used is decreased, and to provide Li$_2$O—Al$_2$O$_3$—SiO$_2$ crystallizable glass as a raw glass material therefor.

According to one aspect of the present invention, there is provided a Li$_2$O—Al$_2$O$_3$—SiO$_2$ crystallized glass which consists essentially of, by weight, 60 to 75% SiO$_2$, 17 to 27% Al$_2$O$_3$, 3 to 5% Li$_2$O, 0 to 0.9% MgO, 0 to 0.9% ZnO, 0.3 to 5% BaO, 0 to 3% Na$_2$O, 0 to 3% K$_2$O, 0 to 4% TiO$_2$, 1 to 4% ZrO$_2$, 0 to 4% P$_2$O$_5$, 0.05 to 2% Sb$_2$O$_3$, 0 to 0.9% MgO+ZnO, and 0 to 4% Na$_2$O+K$_2$O.

According to another aspect of the present invention, there is provided a Li$_2$O—Al$_2$O$_3$—SiO$_2$ crystallizable glass which consists essentially of, by weight, 60 to 75% SiO$_2$, 17 to 27% Al$_2$O$_3$, 3 to 5% Li$_2$O, 0 to 0.9% MgO, 0 to 0.9% ZnO, 0.3 to 5% BaO, 0 to 3% Na$_2$O, 0 to 3% K$_2$O, 0 to 4% TiO$_2$, 1 to 4% ZrO$_2$, 0 to 4% P$_2$O$_5$, 0.05 to 2% Sb$_2$O$_3$, 0 to 0.9% MgO+ZnO, and 0 to 4% Na$_2$O+K$_2$O.

DESCRIPTION OF THE PREFERRED EMBODIMENT

Description will first be made as regards a crystallizable glass and crystallized glass according to the present invention in detail.

The Li$_2$O—Al$_2$O$_3$—SiO$_2$ crystallized glass of the present invention has a β-quartz solid solution or a β-spodumene solid solution produced as a main crystal therein. By the production of the crystal mentioned above, the Li$_2$O—Al$_2$O$_3$—SiO$_2$ crystallized glass is obtained which has a low coefficient of thermal expansion of approximately −10 to 30×10$^{-7}$/° C. (30 to 750° C.) and having high mechanical strength. When a metastable β-quartz solid solution is produced as a main crystal, transparent crystallized glass is obtained. When a metastable β-quartz solid solution is inverted to a stable β-spodumene solid solution by heating at a high temperature, white and opaque crystallized glass is obtained.

Instead of As$_2$O$_3$, antimony oxide (Sb$_2$O$_3$) is used in the crystallized glass of the present invention. Sb$_2$O$_3$ is oxidized to Sb$_2$O$_5$ at approximately 400° C. under melting conditions, and in a high temperature range of 1,000° C. or more, a great deal of oxygen gas is evolved by a reaction caused by a change in valence of the antimony (Sb) ion. The gas evolved diffuses into bubbles remaining in the glass and increases the diameters of the bubbles, so that the bubbles rise and escape, resulting in the fining of the glass. In addition, it was understood through the research by the inventors of the present invention that Sb$_2$O$_3$ functions to promote crystallization in the glass just as As$_2$O$_3$ does.

However, since Sb$_2$O$_3$ is more likely to cause coloration due to impurities (in the present invention, coloration is caused by the impurity Fe$_2$O$_3$ in the presence of TiO$_2$) than As$_2$O$_3$, coloration of the glass would occur if As$_2$O$_3$ were simply replaced with Sb$_2$O$_3$.

Through the intensive research by the present inventors of the present invention, it was discovered that when flux components are decreased, such as alkali metal oxides ($Li_2O$, $Na_2O$, and $K_2O$), alkaline earth oxides (MgO, CaO, and BaO), and a bivalent metal oxide (ZnO), the basicity of the glass is decreased, and as a result, the coloration due to impurities is suppressed. In particular, it was found that when components, such as MgO and ZnO to be incorporated in the crystal produced, i.e., a β-quartz solid solution or a β-spodumene solid crystal, are decreased, condensation of the impurities in the glass is suppressed due to a decrease in the amount of the crystal produced, and coloration due to impurities can be significantly inhibited. Accordingly, the present invention is characterized in that the contents of MgO and ZnO are decreased while $As_2O_3$ is replaced with $Sb_2O_3$.

The effects of $Sb_2O_3$ on fining and promotion of crystallization are lower than those of $As_2O_3$. When the content of $Sb_2O_3$ is increased, the effects thereof can be enhanced. However, as described above, $Sb_2O_3$ facilitates coloration due to impurities more strongly than $As_2O_3$, and as a result the content of $Sb_2O_3$ cannot be increased to a level at which the effects thereof are satisfactory. Accordingly, through the intensive research by the present inventors, it was discovered that barium oxide (BaO) functions to enhance the effect of $Sb_2O_3$ on fining, and when BaO is used with $Sb_2O_3$, oxygen gas evolved from $Sb_2O_3$ effectively clarifies glass, and hence, an effect thereof on fining equivalent to that of $As_2O_3$ can be obtained. The reasons BaO has the effect mentioned above are believed to be that (1) the time for fining is shortened by facilitating dissolving of undissolved raw materials, and (2) bubbles quickly increase in size by lowering the viscosity of a molten solution of the glass and increasing the diffusion velocity of the gas to promote fining. Furthermore, it was also discovered that BaO has a function of improving crystallinity due to a decrease in viscosity in addition to the function of enhancing the effect of $Sb_2O_3$ on fining. In this connection, MgO, ZnO, $Na_2O$, and $K_2O$ also have the same effect as that of BaO. However, since MgO and ZnO promote coloration due to impurities, and when $Na_2O$ or $K_2O$ is added, the coefficients of thermal expansion are increased considerably, the components described above cannot be added to the glass in amounts sufficient to obtain improved clarity and crystallinity. Accordingly, the present invention is characterized in that a specific amount of BaO is contained in the glass as an essential component to obtain the effects described above.

Next, the reasons for the limitation on the composition in the present invention will be described.

The content of $SiO_2$, which is a constituent for forming the crystal and the glass network former, is 60 to 75%, and preferably, 60 to 71%. When the content of $SiO_2$ is less than 60%, the coefficient of thermal expansion is increased considerably. On the other hand, when the content thereof is more than 75%, the glass is difficult to melt.

The content of $Al_2O_3$ is a constituent for forming the crystal and the glass network former. The content of $Al_2O_3$, is 17 to 27%, and preferably, 17 to 24%. When the content of $Al_2O_3$ is less than 17%, the chemical resistance is deteriorated, and the glass is likely to devitrify. On the other hand, when the content thereof is more than 27%, the glass is difficult to melt due to the viscosity thereof being too high.

$Li_2O$ is a component for constituting the crystal and has a function of decreasing the viscosity thereof in addition to a significant influence on the crystallinity of the glass. The content of $Li_2O$ is 3 to 5%, and preferably, 3.2 to 4.8%. When the content of $Li_2O$ is less than 3%, the crystallinity of the glass is low, and the coefficient of thermal expansion is also increased considerably. In addition, when the glass is transparent crystallized glass, white turbidity is likely to occur, and when the glass is white crystallized glass, the degree of whiteness tends to fall. On the other hand, when the content of $Li_2O$ is more than 5%, the glass is likely to devitrify due to significantly high crystallinity. Since a metastable β-quartz solid solution is difficult to obtain, white turbidity occurs and transparent crystallized glass is difficult obtain.

The content of MgO and the content of ZnO are respectively 0 to 0.9%, and preferably, 0 to 0.7%. When the contents of MgO and ZnO are each more than 0.9%, the crystallinity is high, and coloration due to impurities is intense due to an increase in the amount of crystal produced.

The total content of MgO and ZnO is 0 to 0.9%, and preferably, 0 to 0.7%. When the total content of MgO and ZnO is more than 0.9%, coloration due to impurities is intense due to an increase in the amount of crystal produced. When the content of MgO and the content of ZnO are compared on a weight basis, MgO causes coloration due to impurities more than ZnO since MgO is greater than ZnO on a molar basis. Consequently, in order to more effectively prevent coloration due to impurities, it is preferable to decrease the content of MgO than to decrease the content of ZnO.

The content of BaO has effects on improvement of clarity and crystallinity and is 0.3 to 5%, and preferably, 0.5 to 4%. When the content of BaO is less than 0.3%, the clarity is deteriorated, and desired characteristics of the glass are difficult to obtain due to the low crystallinity. On the other hand, when the content of BaO is more than 5%, a sufficient amount of crystal is difficult to obtain since production of crystal is inhibited, and hence, the coefficient of thermal expansion is significantly increased. In addition, in the case of forming transparent crystallized glass, white turbidity in the crystal is likely to occur.

The content of $Na_2O$ and the content of $K_2O$ are respectively 0 to 3%, and preferably, 0 to 2%. When the contents of $Na_2O$ and $K_2O$ are each more than 3%, a sufficient amount of the crystal cannot be obtained due to a decrease in crystallinity, in addition to a significant increase in the coefficient of thermal expansion. Furthermore, when transparent crystallized glass is produced, white turbidity in the crystal is likely to occur.

The total amount of $Na_2O$ and $K_2O$ is 0 to 4%, and preferably, 0 to 3%. When the total content thereof is more than 4%, the coefficient of thermal expansion is significantly increased. In addition, white turbidity in the crystal is likely to occur when transparent crystallized glass is produced.

The content of $TiO_2$ as a nucleation agent is 0 to 4%, and preferably, 0 to 3%. When the content of $TiO_2$ is more than 4%, the coloration due to impurities is intense.

The content of $ZrO_2$ as a nucleation agent is 1 to 4%, and preferably, 1 to 3.5%. When the content of $ZrO_2$ is less than 1%, a sufficient amount of crystal cannot be obtained due to a decrease in crystallinity. On the other hand, when the content of $ZrO_2$ is more than 4%, the glass is strongly devitrified in addition to it being difficult to melt the glass.

The content of $P_2O_5$ is a component for improving the crystallinity of glass and is 0 to 4%, and preferably, 0 to 3%. When the content of $P_2O_5$ is more than 4%, the coefficient of thermal expansion is significantly increased, and white turbidity in the crystal is likely to occur when transparent crystallized glass is produced.

The content of $Sb_2O_3$ is 0.05 to 2%, and preferably, 0.1 to 1.5%. When the content of $Sb_2O_3$ is less than 0.05%, the effects of promoting fining and crystallization cannot be obtained, and when the content is more than 2%, the coloration due to impurities is considerable.

In the crystallized glass of the present invention, BaO and $Sb_2O_3$ have significant influence on clarity and crystallinity and are preferably adjusted so as to have the ratio of $BaO/Sb_2O_3$ from 0.2 to 10 on a weight percent basis, and more preferably, from 0.3 to 9. When the ratio of $BaO/Sb_2O_3$ is less than 0.2, satisfactory effects of promoting fining and crystallization are difficult to obtain. On the other hand, when the ratio of $BaO/Sb_2O_3$ is more than 10, a sufficient amount of crystal cannot be obtained due to a decrease in crystallinity, and as a result, desired characteristics of the glass are difficult to obtain.

Similarly to the above, the total content of $Li_2O$ and $Sb_2O_3$, both of which have significant influence on clarity and crystallinity, is 4 to 6%, and preferably, 4.2 to 5.8%. When the total content of $Li_2O$ and $Sb_2O_3$ is less than 4%, since the crystallinity of the glass is decreased, white turbidity in transparent crystallized glass or degradation of whiteness of white crystallized glass is likely to occur. On the other hand, when the total content of $Li_2O$ and $Sb_2O_3$ is more than 6%, a metastable β-quartz solid solution is difficult to obtain due to significantly high crystallinity, white turbidity in the crystal may occur, and as a result, transparent crystallized glass may be difficult to obtain.

Furthermore, various components other than those described above may be added to the crystallized glass of the present invention.

For example, in order to enhance the effect on fining and the effect on promotion of crystallinity, $SnO_2$ may be added in an amount of up to 0.8%, and preferably, up to 0.6%. $SnO_2$ acts as a fining agent by evolving oxygen at a higher temperature than $Sb_2O_3$. In addition, since $SnO_2$ forms $ZrO_2$—$TiO_2$—$SnO_2$ crystal nuclei together with $TiO_2$ and $ZrO_2$, $SnO_2$ also acts as a nucleation agent. However, since $SnO_2$ is more likely to cause coloration due to impurities than $Sb_2O_3$ and $As_2O_3$, it is not preferable that $SnO_2$ be added in an amount exceeding the content mentioned above. In addition, chlorine may be added to glass; however, it is not preferable that the content thereof be more than 1%, since chemical resistance is deteriorated. Fining agents other than those mentioned above may be added to glass; however, the contents thereof must be limited to ranges in which the fining agents do not adversely affect the characteristics of glass. In this connection, in order to complement the effects on fining and promotion of crystallinity, $As_2O_3$ may be added in an amount of up to approximately 0.8%. However, the amount of $As_2O_3$ added should be as small as possible, and it is recommendable not to use $As_2O_3$, if possible.

Furthermore, a coloring agent, such as $Fe_2O_3$, may be added in an amount of up to 0.1%.

The $Li_2O$—$Al_2O_3$—$SiO_2$ crystallized glass of the present invention having the composition described above can be produced by a manufacturing method described below.

Raw material having the composition described below on a percent by weight basis is prepared: 60 to 75% $SiO_2$, 17 to 27% $Al_2O_3$, 3 to 5% $Li_2O$, 0 to 0.9% MgO, 0 to 0.9% ZnO, 0.3 to 5% BaO, 0 to 3% $Na_2O$, 0 to 3% $K_2O$, 0 to 4% $TiO_2$, 1 to 4% $ZrO_2$, 0 to 4% $P_2O_5$, 0.05 to 2% $Sb_2O_3$, 0 to 0.9MgO+ZnO, and 0 to 4% $Na_2O+K_2O$. In addition, when necessary, $SnO_2$, chlorine, $Fe_2O_3$, and the like may be added.

The glass material thus prepared is melted at 1,550 to 1,750° C. for 4 to 20 hours, and the molten glass material is then molded, whereby $Li_2O$—$Al_2O_3$—$SiO_2$ crystallizable glass is obtained.

The molded material composed of the crystallizable glass is then held at 700 to 800° C. for 1 to 4 hours so as to form nuclei. Subsequently, in order to obtain transparent crystallized glass, the molded material is heated at 800 to 950° C. for 0.5 to 3 hours so as to produce a β-quartz solid solution, and in order to obtain white and opaque crystallized glass, the molded material is heated at 1,050 to 1,250° C. for 0.5 to 2 hours so as to produce a β-spodumene solid solution.

After the crystallized glass thus obtained is processed by, for example, cutting, polishing, bending, painting thereon, and the like, the crystallized glass is applied to various applications.

EXAMPLE

Hereinafter, the $Li_2O$—$Al_2O_3$—$SiO_2$ crystallized glass of the present invention will be described with reference to the examples.

Tables 1 and 2 show compositions of the examples (Samples #1 to 10) and comparative examples (Samples #11 and 12). In this connection, the sample #11 is a composition of a conventional crystallized glass.

TABLE 1

| | Examples | | | | | |
|---|---|---|---|---|---|---|
| | 1 | 2 | 3 | 4 | 5 | 6 |
| $SiO_2$ | 63.6 | 64.6 | 67.7 | 67.1 | 68.0 | 66.5 |
| $Al_2O_3$ | 22.0 | 22.0 | 21.0 | 20.1 | 19.3 | 22.5 |
| $Li_2O$ | 4.4 | 4.5 | 4.1 | 3.9 | 4.2 | 4.0 |
| MgO | — | 0.3 | 0.5 | 0.6 | 0.1 | 0.4 |
| ZnO | 0.4 | 0.4 | 0.2 | — | 0.4 | — |
| BaO | 3.3 | 3.0 | 1.0 | 2.1 | 1.0 | 0.8 |
| $Na_2O$ | 0.5 | 0.3 | — | 0.7 | 0.8 | — |
| $K_2O$ | 0.6 | 0.6 | — | 0.7 | 0.4 | 0.6 |
| $TiO_2$ | 1.7 | 0.5 | 1.4 | 2.3 | 1.2 | 0.6 |
| $ZrO_2$ | 2.1 | 1.8 | 1.6 | 1.2 | 1.6 | 2.0 |
| $P_2O_5$ | 0.9 | 0.9 | 1.0 | — | 1.3 | 1.5 |
| $Sb_2O_3$ | 0.5 | 0.5 | 1.0 | 0.5 | 1.0 | 1.0 |
| $As_2O_3$ | — | 0.4 | — | 0.5 | — | — |
| $SnO_2$ | — | — | 0.4 | 0.3 | 0.5 | — |
| Cl | — | 0.2 | 0.1 | — | 0.2 | 0.1 |
| MgO + ZnO | 0.4 | 0.7 | 0.7 | 0.6 | 0.5 | 0.4 |
| $Na_2O + K_2O$ | 1.1 | 0.9 | 0.0 | 1.4 | 1.2 | 0.6 |

TABLE 2

| | Examples | | | | Comparative Examples | |
|---|---|---|---|---|---|---|
| | 7 | 8 | 9 | 10 | 11 | 12 |
| $SiO_2$ | 66.8 | 67.7 | 69.3 | 68.9 | 65.8 | 65.8 |
| $Al_2O_3$ | 19.0 | 19.2 | 18.0 | 17.5 | 21.1 | 21.1 |
| $Li_2O$ | 3.5 | 4.8 | 4.2 | 4.5 | 4.2 | 4.2 |
| MgO | — | 0.4 | 0.2 | 0.3 | 0.5 | 0.5 |
| ZnO | — | 0.2 | 0.3 | 0.4 | 1.0 | 1.0 |
| BaO | 3.2 | 0.5 | 1.7 | 2.4 | — | — |
| $Na_2O$ | 0.4 | 0.5 | 0.8 | 0.6 | 0.5 | 0.5 |
| $K_2O$ | 0.3 | 0.5 | — | 0.2 | 0.3 | 0.3 |
| $TiO_2$ | 2.2 | 1.3 | 1.1 | 1.3 | 1.9 | 1.9 |
| $ZrO_2$ | 2.0 | 2.0 | 2.4 | 2.3 | 2.3 | 2.3 |
| $P_2O_5$ | 1.3 | 1.7 | 1.2 | 0.6 | 1.4 | 1.4 |
| $Sb_2O_3$ | 1.3 | 1.2 | 0.7 | 1.0 | — | 1.0 |
| $As_2O_3$ | — | — | — | — | 1.0 | — |
| $SnO_2$ | — | — | — | — | — | — |
| Cl | — | — | 0.1 | — | — | — |
| MgO + ZnO | 0.0 | 0.6 | 0.5 | 0.7 | 1.5 | 1.5 |
| $Na_2O + K_2O$ | 0.7 | 1.0 | 0.8 | 0.8 | 0.8 | 0.8 |

Individual samples were prepared by the steps described below.

Raw materials in the forms of oxides, hydroxides, halogenated compounds, carbonates, nitrate, and the like were measured so as to form glass having compositions in accordance with those listed in the tables. Each glass composition thus prepared was mixed to be homogeneous and was melted in an electric furnace using a platinum crucible at 1,550 to 1,650° C. for 8 to 20 hours. Subsequently, the molten glass was cast on a surface plate made of carbon and was formed into 5 mm-thick glass sheets by using a roller made of stainless steel. The 5 mm-thick glass sheets were then cooled to the room temperature by using a slow cooling furnace. Furthermore, the glass sheets thus formed were crystallized in an electric furnace by heating in accordance with two schedules described below, and the glass sheets were then cooled in the furnace.

Schedule (1) Nucleation: 780° C. for 2 hours, and crystal growth: 900° C. for 3 hours Schedule (2) Nucleation: 780° C. for 2 hours, and crystal growth: 1,160° C. for 1 hour In the schedules described above, rates of increasing temperature were set to be 300° C./hour from room temperature to the temperature for nucleation and to be 100 to 200° C./hour from the temperature for nucleation to the temperature for crystal growth.

Main crystals, appearances, coefficients of thermal expansion, crystallinity, coloration due to impurities, and clarity were measured for the samples thus obtained. The results are shown in Tables 3 and 4. In this connection, "β-Q" and "β-S" in the tables stand for a β-quartz solid solution and a β-spodumene solid solution, respectively.

TABLE 3

| | Examples | | | | | |
|---|---|---|---|---|---|---|
| | 1 | 2 | 3 | 4 | 5 | 6 |
| Schedule (1) | | | | | | |
| Main crystal | β-Q | β-Q | β-Q | β-Q | β-Q | β-Q |
| Appearance | colorless & transparent | colorless & transparent | colorless & transparent | colorless & transparent | colorless & transparent | colorless & transparent |
| Coefficient of Thermal Expansion ($\times 10^{-7}/°$ C.) | 1 | 1 | −1 | −1 | −2 | −3 |
| Crystallinity | ○ | ○ | ○ | ○ | ○ | ○ |
| Coloration due to Impurities | ○ | ○ | ○ | ○ | ○ | ○ |
| Schedule (2) | | | | | | |
| Main crystal | β-S | β-S | β-S | β-S | β-S | β-S |
| Appearance | white & opaque | white & opaque | white & opaque | white & opaque | white & opaque | white & opaque |
| Coefficient of Thermal Expansion ($\times 10^{-7}/°$ C.) | 17 | 14 | 12 | 14 | 11 | 9 |
| Crystallinity | ○ | ○ | ○ | ○ | ○ | ○ |
| Coloration due to Impurities | ○ | ○ | ○ | ○ | ○ | ○ |
| Clarity (pieces/100 g) | 4 | 3 | 3 | 1 | 2 | 3 |

TABLE 4

| | Examples | | | | Comparative Examples | |
|---|---|---|---|---|---|---|
| | 7 | 8 | 9 | 10 | 11 | 12 |
| Schedule (1) | | | | | | |
| Main crystal | β-Q | β-Q | β-Q | β-Q | β-Q | β-Q |
| Appearance | colorless & transparent | colorless & transparent | colorless & transparent | colorless & transparent | colorless & transparent | colorless & transparent |
| Coefficient of Thermal Expansion ($\times 10^{-7}/°$ C.) | 0 | −4 | −4 | −2 | −3 | −4 |
| Crystallinity | ○ | ○ | ○ | ○ | ○ | X |
| Coloration due to Impurities | ○ | ○ | ○ | ○ | ○ | X |
| Schedule (2) | | | | | | |
| Main crystal | β-S | β-S | β-S | β-S | β-S | β-S |
| Appearance | white & opaque | white & opaque | white & opaque | white & opaque | white & opaque | white & opaque |
| Coefficient of Thermal Expansion ($\times 10^{-7}/°$ C.) | 14 | 9 | 8 | 8 | 11 | 10 |
| Crystallinity | ○ | ○ | ○ | ○ | ○ | X |
| Coloration due to Impurities | ○ | ○ | ○ | ○ | ○ | X |
| Clarity (pieces/100 g) | 1 | 1 | 3 | 3 | 1 | 12 |

As can be seen in the Tables, the samples obtained by the schedule (1) had β-quartz solid solution produced as a main crystal, were colorless and transparent in appearance, and had coefficients of thermal expansion of −4 to $1 \times 10^{-7}/°$ C. from 30 to 750° C. The samples obtained by the schedule (2) had β-spodumene solid solution produced as a main crystal, were white and opaque in appearance, and had coefficients of thermal expansion of 8 to $17 \times 10^{-7}/°$ C. from 30 to 750° C. In addition, both samples formed by the schedules (1) and (2) had superior crystallinity, no coloration due to impurities, and clarity equivalent to that of the conventional product (Sample #11).

In contrast, when $As_2O_3$ was simply replaced with $Sb_2O_3$ as shown in the comparative sample #12, clarity and crystallinity were not satisfactory, and coloration due to impurities was also observed.

The main crystal was measured by using an x-ray diffraction apparatus. In order to measure the coefficient of thermal expansion, a simple rod 50 mm long and 5 mm in diameter was formed from the sample, and an average coefficient of thermal expansion from 30 to 750° C. was measured by using the simple rod. Crystallinity was measured by the existence of defects, such as cracks and surface separation after crystallization. No defect is indicated by a symbol of "○", and the existence of defect is indicated by a symbol of "x". Concerning coloration due to impurities, the samples of crystallized glass were compared with the conventional crystallized glass (Sample #11). Samples having no change in color are indicated by "○", and the samples having deep colors are indicated by "x". Concerning clarity, glass materials were melted at 1,550 to 1,650° C. for 4 to 8 hours, and samples were formed from the molten glass thus obtained by roll forming. The number of bubbles in the sample thus formed was counted, and the number of bubbles per 100 g was then calculated.

As has thus been described, even when the content of $As_2O_3$ is decreased, the $Li_2O$—$Al_2O_3$—$SiO_2$ crystallized glass of the present invention has the clarity and glass characteristics equivalent to or superior to those of the conventional crystallized glass. Accordingly, the $Li_2O$—$Al_2O_3$—$SiO_2$ crystallized glass of the present invention is a suitable material for use in front glass panels in kerosene heaters, wood stoves, and the like; substrates for high-technology products, such as color filters and image sensors; setters for baking electronic devices; shelf boards for microwave ovens; top plates for electromagnetic cooking devices; window glass for fire doors; and the like.

In addition, the $Li_2O$—$Al_2O_3$—$SiO_2$ crystallized glass described above can be easily produced by using the $Li_2O$—$Al_2O_3$—$SiO_2$ crystallizable glass of the present invention.

What is claimed is:

1. $Li_2O$—$Al_2O_3$—$SiO_2$ crystallized glass consisting essentially of, by weight, 60 to 75% $SiO_2$, 17 to 27% $Al_2O_3$, 3 to 5% $Li_2O$, 0 to 0.9% MgO, 0 to 0.9% ZnO, 0.3 to 5% BaO, 0 to 3% $Na_2O$, 0 to 3% $K_2O$, 0 to 4% $TiO_2$, 1 to 4% $ZrO_2$, 0 to 4% $P_2O_5$, 0.05 to 2% $Sb_2O_3$, 0 to 0.9% MgO+ZnO, and 0 to 4% $Na_2O+K_2O$.

2. $Li_2O$—$Al_2O_3$—$SiO_2$ crystallizable glass consisting essentially of, by weight, 60 to 75% $SiO_2$, 17 to 27% $Al_2O_3$, 3 to 5% $Li_2O$, 0 to 0.9% MgO, 0 to 0.9% ZnO, 0.3 to 5% BaO, 0 to 3% $Na_2O$, 0 to 3% $K_2O$, 0 to 4% $TiO_2$, 1 to 4% $ZrO_2$, 0 to 4% $P_2O_5$, 0.05 to 2% $Sb_2O_3$, 0 to 0.9% MgO+ZnO, and 0 to 4% $Na_2O+K_2O$.

* * * * *